Jan. 19, 1937.  W. W. STUART  2,068,283
ELECTRICAL CONTROL SYSTEM
Filed Jan. 28, 1936
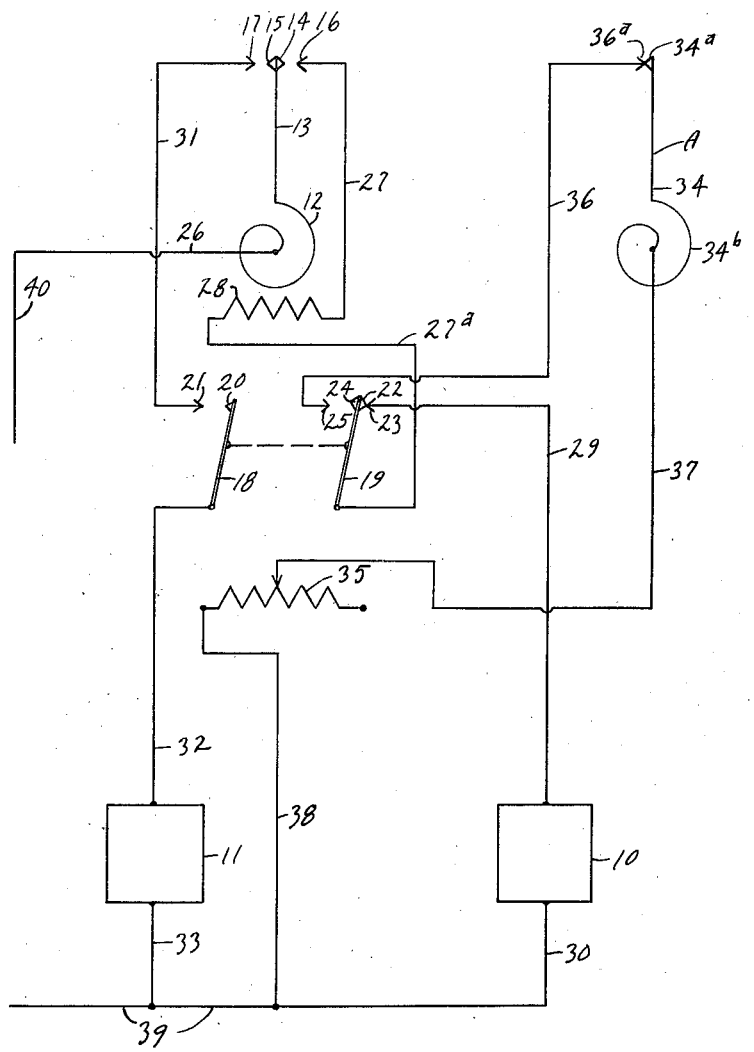
Witness
H. S. Munzenmaier
Inventor
William W. Stuart
By Bair, Freeman & Sinclair
Attorneys Patented Jan. 19, 1937

2,068,283

UNITED STATES PATENT OFFICE 2,068,283

ELECTRICAL CONTROL SYSTEM

William W. Stuart, Des Moines, Iowa.

Application January 28, 1936, Serial No. 61,167

7 Claims. (Cl. 236—1)

The object of my invention is to provide in a cooling and heating system, having heating means and cooling means, a control structure including a summer-winter thermostat and anticipating heater means associated with the thermostat to hasten the action of the thermostat for stopping the operation of one controlled means and to hasten the action of the thermostat for starting the operation of the other controlled means.

Another object is to provide in such a system means for varying the action of the anticipating heater.

Still another object is to provide in such a system, means for cutting out the anticipating heater when certain conditions exist.

With these and other objects in view, my invention consists in the construction, arrangement and combination of the various parts of my control system, whereby the objects contemplated are attained, as hereinafter more fully pointed out in my claims, and illustrated in the accompanying drawing, in which:

The single figure sets forth diagrammatically a heating and cooling system in which my invention is employed.

There is a very definite trend at the present time toward the installation of combination heating and cooling means for residences and various business places. Such installations have heating means, such as oil burners, and cooling means such as refrigeration equipment. In such systems, summer-winter thermostats are now known elements.

What is called an anticipating thermostat is now a known structure. Such a thermostat is shown for instance in the Persons Patent No. 2,024,385, and the Shafer Patent No. 1,583,496, referred to therein.

These anticipating thermostats have a heater which hastens the opening action of the switch, after the thermostat has called for heat and closed the switch. This shortens the duration of an operation and increases the number of operations, and results in the maintenance of a more even temperature. However, when the thermostat is used for both winter heating and summer cooling, the anticipating heater causes a problem to arise. If left in the circuit, it then functions, not as an anticipating heater, but as a delaying heater, and serves to lengthen the operation period of the apparatus when the cooling means is in service.

It is my object as hereinbefore set forth to provide a structure in which an anticipating heater can be used in a summer-winter thermostat to perform its function of shortening the operating period when the cooling device is in service as well as when the heating device is in service.

Other objects have been mentioned and still others will appear from my description and explanation.

A structure by which my purpose can be accomplished is shown in the drawing, in which the reference numeral 10 indicates a heating means, in which the production of heat or the distribution of heat, or both, may be electrically controlled.

The cooler is indicated at 11 and may be any type of cooling equipment that may be electrically controlled.

It will be understood that one or a considerable number of rooms may be air conditioned by a system of this kind.

I have shown a summer-winter thermostat, having the temperature sensitive member 12, which may be of the bimetallic thermostat type, having the arm 13 actuated from the member 12 and carrying the contacts 14 and 15, which are arranged to cooperate respectively with the contacts 16 and 17. This is any kind of structure of the snap action or equivalent type.

The thermostat is subject to the temperature in the room in which the air is to be conditioned.

The contact 14 engages the contact 16 for closing the heating circuit, when the thermostat is used for heating service, and the contact 15 engages the contact 17 to close the cooling circuit.

I provide a summer-winter switch, which as here shown is adapted to be manually operated. It is of the double throw type, having the arms 18 and 19 arranged to be simultaneously actuated. The arm 18 has the contact 20, which is arranged to coact with the contact 21. The arm 19 has the contact 22 arranged to coact with the contact 23. The arm 19 also has the contact 24 to coact with the contact 25. This switch may be an automatic one.

The line wire 40 is electrically connected by a wire 26 with the contacts 14 and 15 as for instance through the member 12 and the arm 13.

The contact 16 is connected by a conducting wire 27 with the anticipating heater 28.

The heater 28 is located to heat the temperature sensitive member 12, and is connected by a wire 27a with the arm 19.

It will be understood that the heater 10 and the cooler 11 are provided with elements arranged to be actuated when included in electric circuits, such as motors or valves or dampers.

The contact 23 is electrically connected to the heater 10 by the wire 29 and the heater is connected through a wire 30 with the other line wire 39.

The contact 17 is connected by a wire 31 with the contact 21.

The contact 20 and arm 18 are connected by a conducting wire 32 with the cooler 11, which is in turn connected by the wire 33 with the line wire 39.

The contact 25 is connected by a wire 36 to a contact 36a of a switch A which has a coacting contact 34a on the arm 34. The arm 34 of the switch A is electrically and operatively connected with the temperature sensitive member 34b. The member 34b is connected by a wire 37 with the adjustable resistance 35.

The switch A may be of the automatic type as illustrated or may be manually operable. The resistance 35 is connected by a wire 38 to the line wire 39.

The thermostat switch A is subject to the temperature in the room to be air conditioned, but is sufficiently isolated from the heater 28, so as not to be substantially affected by the heat emanating from the heater.

*Operation when heater is in service*

In the use of this control, if it be assumed that the heater is to be automatically operated in cold weather, the switch arms 18 and 19 are moved to position where the contact 22 engages the contact 23.

Assume that the temperature of the room in which the element 12 is located has dropped to the point, where according to its setting, the thermostat calls for heat.

Contact 14 then engages contact 16. A circuit is thus closed from the line wire 40 through the wire 26, thermostatic element 12, arm 13, contacts 14 and 16, wire 27, heater 28, wire 27a, arm 19 contact 22, contact 23, wire 29, heater 10, wire 30 and line wire 39.

The heater 10 then functions.

The combined effect of the rise in room temperature and of the heater 28, on the element 12, results in the separation of the contacts 14 and 16 and the breaking of the circuit above described. The heater 10 is thus shut down.

This is the usual operation.

It will be noted that when the circuit is broken, the arm 13 moves to position where the contact 15 engages contact 17. No circuit is thereby closed, because of the gap between the contacts 21 and 20 existing by reason of the position of the arms 18 and 19 of the summer-winter switch.

In the operation, the heater 28 aids in raising the temperature of the member 12 while the heater 10 is raising the room temperature.

The effect is to cause the circuit to break earlier than would be the case if the anticipating heater 28 were not used.

These anticipating heaters are used to prevent undesirable overruns and contribute to the maintenance of more even temperature in the room.

*Operation when cooler is in service*

In summer or when it is warm, and it is desired to use the cooler, the switch arms 18 and 19 are moved away from their positions shown in the drawing to positions where the contact 20 engages the contact 21 and the contact 24 engages the contact 25.

Assume a condition in the room in which the sensitive element 12 is located, that causes the element to call for an operation of the apparatus which it controls (in this case a cooler).

The contact 15 engages the contact 17. Thereupon a circuit is closed from the line wire 40, through wire 26, element 12, arm 13, contacts 15 and 17, wire 31, contacts 21 and 20, arm 18, wire 32, cooler 11, wire 33 and line wire 39.

Thereupon the cooler will function.

When the temperature has been lowered to the point where the element 12 functions to separate contacts 15 and 17, the circuit just described is broken and the operation of the cooler ceases.

In the circuit breaking operation, the arm 13 moves the contact 14 into engagement with the contact 16.

By so doing, a circuit is closed during the stand-by period from the line wire 40 through wire 26, element 12, arm 13, contacts 14 and 16, wire 27, heater 28, wire 27a, arm 19, contact 24, contact 25, wire 36, contact 36a, contact 34a, arm 34, element 34b, wire 37, adjustable resistance 35, wire 38, and line wire 39.

The effect of closing this circuit is to subject the element 12 to heat from the heater 28, thus anticipating a rise in room temperature and causing the thermostat to again call for operation of the cooling equipment earlier than would be the case with a conventional thermostat not equipped with an anticipating heater.

Thus overruns are reduced in amount in both heating and cooling service.

The effect of the heater in cooling service may be varied as desired by adjusting the adjustable resistance 35.

There may be conditions when it is not desirable or necessary to operate the cooling system. For example, where this system is used to cool a home, the weather may be so cool, that there is no reason for operating the system.

If, however, under such conditions, a manually operated summer-winter switch has been set for cooling service, then during the stand-by period, a circuit is normally closed through the heater 28, and unless that circuit were broken, the effect of the heater on the element 12 would result in the unnecessary operation of the cooler.

I have provided means for preventing this unnecessary operation of the cooling system.

The switch A, if of the thermostatic type, can be set to automatically hold open the circuit through the heater 28 when conditions do not warrant the operation of the cooling system. If the switch A is of the manually operated type, it serves the same function, and if opened, and then overlooked, will still permit the cooling equipment to function, although it will function without the anticipating feature of the thermostat.

Where the summer-winter switch is of the automatic type, the switch A may be omitted in some installations.

I claim as my invention:

1. In a system, having a heating device and a cooling device, electrical control means for the devices including a thermostatic switch and heating means arranged to cooperate with the switch to hasten the movement of the switch when either device is in service, and a change over switch for selectively putting either device in service.

2. In combination, a heating device and a cooling device, electrical control means for the devices including a thermostat, and a summer-winter switch, and anticipating heater means adapted to hasten the action of the thermostat for stopping the operation of a controlled device when the switch is in one position and to hasten the action of the thermostat for starting the operation of a controlled device when the switch is in the other position.

3. In combination, a heating device and a cooling device, electrical control means for the devices including a thermostat, and a summer-winter switch, and anticipating heater means adapted to hasten the action of the thermostat for stopping the operation of a controlled device when the switch is in one position, and to hasten the action of the thermostat for starting the operation of a controlled device when the switch is in the other position, and means for varying at will the effectiveness of the heater when said switch is in the one of said positions.

4. In combination, a heating device and a cooling device, electrical control means for the devices including a thermostat, and a summer-winter switch, and anticipating heater means adapted to hasten the action of the thermostat for stopping the operation of a controlled device when the switch is in one position, and to hasten the action of the thermostat for starting the operation of a controlled device when the switch is in the other position, and means for automatically rendering the anticipating heater inoperative when certain predetermined conditions exist and the switch is in one of its positions.

5. In combination, a heating device and a cooling device, electrical control means for the devices including a thermostat, and a summer-winter switch, and anticipating heater means adapted to hasten the action of the thermostat for stopping the operation of a controlled device when the switch is in one position, and to hasten the action of the thermostat for starting the operation of a controlled device when the switch is in the other position, and means for rendering the anticipating heater inoperative.

6. In a system having a heating device and a cooling device, control means therefor, including a summer-winter thermostat electrically associated with said devices, an anticipating heater associated with the thermostat to hasten the action of the thermostat in stopping the operation of the heating device when the heating device is in service, and to hasten the action of the thermostat for starting the operation of the cooling device when the cooling device is in service, and a change over switch for selectively putting either device into service.

7. In an air conditioning system, a heating device, a cooling device, a summer-winter thermostat electrically associated therewith, a switch for selectively including either the heating device or the cooling device in circuit with the thermostat, an electrical anticipating heater associated with the thermostat to function during the heating cycle when the heating device is in service, and during the standby period when the cooling device is in service, means for varying the action of said anticipating heater and condition sensitive means for rendering the anticipating heater inoperative when certain conditions exist.

WILLIAM W. STUART.